United States Patent [19]
Tomono et al.

[11] Patent Number: 5,933,318
[45] Date of Patent: *Aug. 3, 1999

[54] LAMINATED CAPACITOR AND PROCESS FOR PRODUCING THE SAME

[75] Inventors: Kunisaburo Tomono, Otsu; Koji Kajiyoshi, Kyoto, both of Japan

[73] Assignee: Murata Manufacturing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/531,324

[22] Filed: Sep. 20, 1995

[30] Foreign Application Priority Data

Sep. 26, 1994 [JP] Japan ..................... 6-229903

[51] Int. Cl.$^6$ ........................................ H01G 4/08
[52] U.S. Cl. ................ 361/323; 361/311; 361/313; 361/321.5; 361/328; 361/541; 29/25.42
[58] Field of Search ..................... 361/311, 312, 361/313, 323, 321.1, 321.2, 321.3, 321.4, 321.5, 328, 306.3, 523, 524, 541, 273, 301.4, 301.3, 305, 308.1, 320; 29/25.41, 25.42, 25.03

[56] References Cited

U.S. PATENT DOCUMENTS

| | | | |
|---|---|---|---|
| 4,424,615 | 1/1984 | Wakino | 29/25.42 |
| 4,433,104 | 2/1984 | Giles, Jr. | 525/180 |
| 4,469,747 | 9/1984 | Sasaki et al. | 428/325 |
| 4,656,557 | 4/1987 | Behn et al. | 361/309 |
| 5,457,598 | 10/1995 | Radford et al. | 361/321.2 |
| 5,459,635 | 10/1995 | Tomozawa et al. | 361/321.5 |

FOREIGN PATENT DOCUMENTS

| | | |
|---|---|---|
| 0192159 | 8/1986 | European Pat. Off. . |
| 4101788 | 7/1992 | Germany . |
| 62-58646 | 12/1987 | Japan . |

*Primary Examiner*—Leo P. Picard
*Assistant Examiner*—Phuong T. Vu
*Attorney, Agent, or Firm*—Ostrolenk, Faber, Gerb & Soffen, LLP

[57] ABSTRACT

A laminated capacitor and a process for producing the same. The laminated capacitor includes a plurality of capacitor assemblies and external electrodes, the capacitor assemblies each including a thermoplastic resin film having consecutively thereon a metal film as a first internal electrode, an inorganic dielectric material film, and a metal film as a second internal electrode, the plurality of capacitor assemblies being laminated with each other to form a laminated body, the external electrodes each being provided on an end surface of the laminated body, on which the first or second internal electrode is exposed, and being electrically connected to the first and second internal electrodes, respectively.

7 Claims, 1 Drawing Sheet

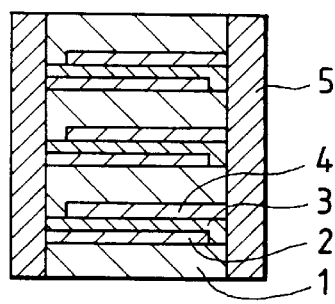
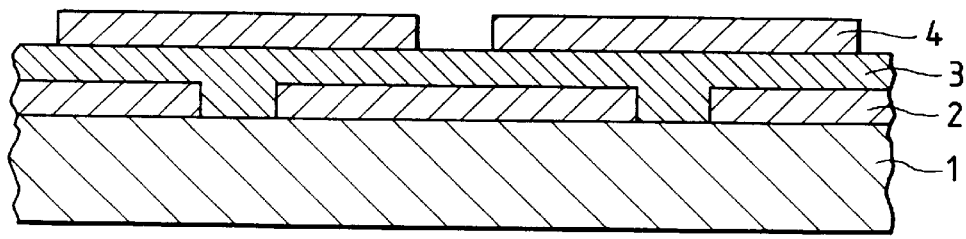
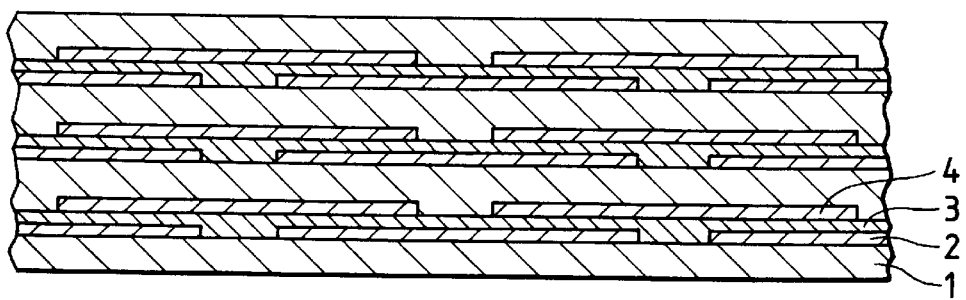

LAMINATED CAPACITOR AND PROCESS FOR PRODUCING THE SAME

FIELD OF THE INVENTION

The present invention relates to a laminated capacitor and a process for producing the same.

BACKGROUND OF THE INVENTION

With the miniaturization of electronic equipment, the number of electronic parts to be accommodated in a unit volume has increased. An element such as a transistor, a diode, or the like relating to an interfacial physical phenomenon can be made extremely small with an improvement of an integrated circuit technique. Since a capacitor has a characteristic that its electrostatic capacity is proportional to an electrode area, it is not easy to realize a capacitor having a large electrostatic capacity and a small size at the same time. Capacitors designed to be large in electrostatic capacity and small in size, such as a laminated ceramic capacitor, an electrolytic capacitor, an electric double-layer capacitor, a thin film capacitor and the like, have been put into practical use.

A laminated ceramic capacitor is produced in the following manner: Powder of a raw material having a high dielectric constant, such as perovskite-type composite oxide, e.g., $BaTiO_3$, is made into a slurry by using an organic binder, and then formed into sheets. Internal electrodes are formed on the respective sheets, and then the sheets are laminated and sintered. That is, a large electrostatic capacity is realized by the use of a high dielectric constant material and by the increase of the electrode area due to lamination. However, it is generally necessary to sinter the powder of the raw material having high dielectric constant at a high temperature not lower than about 1200–1900 degrees Celsius. It is therefore necessary to use an expensive noble metal such as silver, palladium or the like, as the internal electrodes, and a large amount of energy is required for production, and thus not only the production cost is high but also the production process is complicated. Further, since the thickness of the dielectric is about 10 $\mu$m, there is a limitation on further reduction in thickness.

In both the electrolytic capacitor and the electric double-layer capacitor, it has been attempted to increase the surface area of the electrodes to the utmost by making the surface of electrodes uneven. These capacitors however have the following disadvantages.

The electrolytic capacitor, such as an aluminum electrolytic capacitor or a tantalum electrolytic capacitor, is designed so that an anodized film of aluminum or tantalum as an electrode metal is used as a dielectric material. There is therefore no room for selection of the dielectric material so that such an electrolytic capacitor cannot be provided with various capacitor characteristics. Further, the specific dielectric constant of the oxide of those materials is about 90 at the most and is remarkably lower than 2000 or more, which is the value of a high dielectric constant material such as $BaTiO_3$, or the like, used in a ceramic capacitor. Accordingly, even if the electrode area is made large, the capacity of the electrolytic capacitor is relatively low. Moreover, the resulting electrolytic capacitor has a polarity.

The electric double-layer capacitor is not only poor in shock resistance because it contains electrolyte but also low in working voltage, although it is possible to improve the ratio of its electrostatic capacity to its volume.

The thin film capacitor is designed so as to reduce the thickness of the electrode and the dielectric material to the utmost, and generally its film thickness is made to be several hundred nm or less. Reduction in thickness of the dielectric material causes the volume occupied by the dielectric material to be decreased and also the electrostatic capacity to be increased under the condition of the same electrode area. In the thin film capacitors, an oxide thin film, such as $Ta_2O_3$ or the like produced by a vapor phase method, such as evaporation, sputtering or the like methods, is used as the dielectric material. However, its dielectric constant is 90 at the most and is not sufficient for realizing a large capacity.

It has been proposed to reduce a high dielectric constant material such as $BaTiO_3$ in thickness by using a vapor phase method similarly. In this case, it is possible to obtain a specific dielectric constant of several hundred, which is higher than that of an oxide thin film of $Ta_2O_3$, while still being lower than the value of several thousand in the case of a film thickness used in a ceramic capacitor, because a high dielectric characteristic does not sufficiently appear when the film thickness is reduced. Further, since the technique of manufacturing thin film capacitors does not include a lamination technique which is an advantageous feature in the production of the ceramic capacitors, nor a technique for forming a large surface area film which is an advantageous feature in production of the electrolytic capacitors and electric double-layer capacitors, it is impossible to expect an increase in electrode area, so a capacitor of a large capacity has been not yet been realized by use of only a thin-film technique.

As is apparent from the foregoing explanation, in order to realize, at a low cost, a capacitor which is small in size, light in weight and large in electrostatic capacity, it is necessary to solve three problems: it is desired to use a dielectric material having a high dielectric constant which cannot be realized by an electrolytic capacitor; it is desired to make the dielectric material into thin films to an extent corresponding to a thin film capacitor; and the electrode area is to be increased by lamination by using the thin films of the dielectric material in the same manner as a laminated ceramic capacitor.

SUMMARY OF THE INVENTION

An object of the present invention to provide a laminated capacitor in which the foregoing problems are solved and which is small in size, low in cost and large in capacity.

Another object of the present invention to provide a process for producing such a laminated capacitor.

Other objects and effects of the present invention will be apparent from the following description.

The present invention relates to, as a first aspect, a laminated capacitor comprising a plurality of capacitor assemblies and external electrodes, the capacitor assemblies each comprising a thermoplastic resin film having consecutively thereon a metal film as a first internal electrode, an inorganic dielectric material film, and a metal film as a second internal electrode, the plurality of capacitor assemblies being laminated with each other to form a laminated body, the external electrodes each being provided on an end surface of the laminated body, on which the first or second internal electrode is exposed, and being electrically connected to the first and second internal electrodes, respectively.

The present invention also relates to, as a second aspect, a process for producing a laminated capacitor, the process comprising the steps of:

forming a metal film functioning as a first internal electrode on a thermoplastic resin film;

forming an inorganic dielectric material film on the metal film;

forming a metal film functioning as a second internal electrode on the dielectric film to thereby form a capacitor assembly;

laminating with heat and pressure a plurality of the capacitor assemblies to thereby form a laminated body; and forming external electrodes each on an end surface of the laminated body, on which the first or second internal electrode is exposed.

It is preferred in the above first and second aspects of the present invention that the thermoplastic resin film comprises poly(chlorotrifluoroethylene).

The laminated capacitor according to the present invention is produced by laminating with heat and pressure a plurality of capacitor assemblies in each of which an inorganic dielectric film sandwiched by metal films respectively functioning as internal electrodes is formed on one of surfaces of a thermoplastic resin film.

Therefore, a thin film of a material having high dielectric constant can be used as the dielectric film and a thin film of a metal can be used as the electrode. Further, it is possible to easily increase the electrode area through lamination with heat and pressure without performing a sintering operation at a high temperature, unlike in the conventional laminated ceramic capacitor.

BRIEF DESCRIPTION OF THE DRAWINGS

FIG. 1 is a sectional view showing an embodiment of the laminated capacitor according to the present invention.

FIG. 2(a) is a sectional view showing a capacitor assembly in the process of producing the laminated capacitor according to the present invention.

FIG. 2(b) is a sectional view showing a laminated body comprising a plurality of the capacitor assemblies in the process of producing the laminated capacitor according to the present invention.

DESCRIPTION OF A PREFERRED EMBODIMENTS

Description will be made below of an embodiment of the thin film capacitor according to the present invention with reference to the drawings. However, the present invention is not construed as being limited thereto.

FIG. 1 is a sectional view showing an embodiment of the laminated capacitor according to the present invention, which comprises a plurality of capacitor assemblies and external electrodes 5. Each capacitor assembly, as shown in FIG. 2(a), comprises a thermoplastic resin film 1 having consecutively thereon a metal film as a first internal electrode 2, an inorganic dielectric material film 3, and a metal film as a second internal electrode 4. A plurality of capacitor assemblies, as well as one thermoplastic resin film covering the surface of the second internal electrode of the uppermost capacitor assembly, are laminated to form a laminated body as shown in FIG. 2(b). Each of the external electrodes 5 is provided on an end surface of the laminated body, on which one of the first and second internal electrodes is exposed, so as to be electrically connected to the internal electrode.

Examples of the material of the thermoplastic resin film include poly(chlorotrifluoroethylene) (PCTFE), polypropylene, polycarbonate, and polyamide, with PCTFE being preferred. Examples of the material of the metal film as internal electrodes include platinum (Pt), palladium (Pd), gold (Au) and its alloys, tantalum (Ta), copper (Cu), Nickel (Ni), and titanium (Ti). Examples of the material of dielectric material film include barium titanate ($BaTiO_3$), strontium titanate ($SrTiO_3$), lead titanate ($PbTiO_3$), calcium titanate ($CaTiO_3$), and their solid solutions. Further, when tantalum is used as the metal film, $Ta_2O_3$, which is an anodized film of tantalum, may be used as the dielectric material film. Further, it is not necessary to use the same metal for forming the metal films on the upper and lower surfaces of the dielectric material film, but it suffices to select proper materials in view of suitability with the process of forming the dielectric material film and in view of the production cost.

Examples of the material of the external electrode include silver (Ag), palladium (Pd), platinum (Pt), gold (Au), copper (Cu), and their alloys.

The thickness of thermoplastic resin film is generally from 10 to 1,000 $\mu$m. The thickness of the internal electrode is generally from 0.1 to 10 $\mu$m. The thickness of the inorganic dielectric material film is generally from 0.1 to 20 $\mu$m. The number of the capacitor assemblies constituting the laminated capacitor is not particularly limited.

The method for forming the internal electrode and the inorganic dielectric material film is not particularly limited, and examples thereof include a high frequency sputtering process, a vacuum evaporation process, and a chemical vapor deposition (CVD) process. The conditions of laminating the capacitor assemblies to form a laminated body can be determined depending on the properties of the thermoplastic resin film. For example, the lamination can be effected at a temperature of from 150 to 250° C. and a pressure of from 5 to 20 kg/cm$^2$.

The present invention will be further described in more detail with reference to the following specific examples but is not construed as being limited thereto.

EXAMPLE 1

A thermoplastic resin film 1 composed of a poly (chlorotrifluoroethylene) (hereinafter referred to as PCTFE) film having a length of 30 mm, a width of 20 mm, and a thickness of 500 $\mu$m was prepared. A metal film 2 composed of a Pt thin film having a length of 2.8 mm, a width of 20 mm, and a thickness of 0.5 $\mu$m was formed on the thermoplastic resin film 1 by using a known high frequency sputtering apparatus with a target of Pt so as to function as a first internal electrode. Separately, $BaCO_3$—$TiO_2$ mixed powder was calcined at 900° C. to prepare $BaTiO_3$ powder, which was then formed into a disk form to produce a $BaTiO_3$ target. An inorganic dielectric film 3 composed of a $BaTiO_3$ having a thickness of 0.5 $\mu$m was formed on the metal film on the PCTFE film at a film formation temperature of 200° C. by using the $BaTiO_3$ target in the known sputtering apparatus. Thereafter, a metal film 4 composed of a Pt thin film and having a thickness of 0.5 $\mu$m was formed on the dielectric material film 3 in the same manner as the metal film 2 so as to function as the second internal electrode. Thus, a capacitor assembly comprising a four-layer film including the thermoplastic resin film 1, the metal film 2, the dielectric film 3 and the metal film 4, as shown in FIG. 2(a).

Three capacitor assemblies each produced in the manner as described above and having a thickness of about 500 $\mu$m were stacked in a metal mold and one PCTFE film was further stacked on the three assemblies so as to laminate under pressure of about 10 kg/cm$^2$ at a temperature of 200°

C., so that a laminated body having a length of 30 mm, a width of 20 mm, and a thickness of 1.5 mm was produced as shown in FIG. 2(b). The produced laminated body was cut into pieces each of which has a length of 3.0 mm and a width of 2.0 mm and in each of which the metal films 2 and 4 were exposed on a pair of end surfaces opposite to each other, respectively. A conductive silver paste was applied onto the opposite end surfaces of each piece of lamination and dried so as to form external electrodes 5. Thus, a laminated capacitor in the form of a chip as shown in FIG. 1 was completed.

The electrostatic capacity between the external electrodes was 67 pF as measured under the condition that the frequency was 1 kHz and the voltage was 1.0 Vrms.

EXAMPLE 2

A laminated capacitor was prepared in which PCTFE was used as the thermoplastic resin film, a Pt thin film was used as the metal film, and a $BaTiO_3$ thin film was used as the dielectric film in the same manner as in Example 1, and in which the film thickness of the PCTFE was changed to 20 $\mu$m and the number of capacitor assemblies each comprising a four-layer film was changed to 50.

That is, a metal film composed of a Pt thin film having a length of 2.80 mm, a width of 20 mm, and a thickness of 0.5 $\mu$m was formed on a thermoplastic resin film composed of a PCTFE film having a length of 30 mm, a width of 20 mm, and a thickness of 20 $\mu$m, and a dielectric film composed of a $BaTiO_3$ thin film having a thickness of 0.5 $\mu$m and a metal film composed of a Pt thin film having a thickness of 0.5 $\mu$m were successively formed on the Pt thin metal film, so that a capacitor assembly comprising a four-layer film including the thermoplastic resin film 1, the metal film 2, the dielectric film 3 and the metal film 4 was produced.

Fifty capacitor assemblies each produced in a manner as described above and each having a thickness of about 20 $\mu$m were stacked in a metal mold and one PCTFE film was further stacked on the fifty capacitor assemblies, so that a laminated body having a length of 30 mm, a width of 20 mm, and a thickness of 1.5 mm was produced. The thus-produced laminated body was cut into pieces each having a length of 3.0 mm and a width of 2.0 mm. A conductive silver paste was applied onto opposite end surfaces of each piece of laminated body and dried so as to form the external electrodes. Thus, a laminated capacitor in the form of a chip was completed.

The electrostatic capacity between the external electrodes was 1.1 $\mu$F when it was measured under the condition that the frequency was 1 kH$_z$ and the voltage was 1.0 Vrms.

As apparent from the foregoing description, the laminated capacitor according to the present invention is produced by laminating with heat and pressure a plurality of capacitor assemblies in each of which an inorganic dielectric film sandwiched between metal films respectively functioning as internal electrodes is formed on one of surfaces of a thermoplastic resin film.

Therefore, a thin film of a high dielectric constant material can be used as the dielectric material film and a thin film of a metal can be used as the electrode. Further, it is possible to easily increase the electrode area through lamination with heat and pressure without sintering at a high temperature, unlike the conventional laminated ceramic capacitor.

Therefore, by the process according to the present invention, it is possible to obtain an inexpensive, small-sized and large-capacity laminated capacitor.

Further, by the laminated capacitor according to the present invention, it is possible to reduce the weight of the laminated capacitor by the configuration of the thin film of a dielectric material, the thin film electrode, and the thermoplastic resin film.

While the invention has been described in detail and with reference to specific examples thereof, it will be apparent to one skilled in the art that various changes and modifications can be made therein without departing from the spirit and scope thereof.

What is claimed is:

1. A laminated capacitor comprising a plurality of capacitor assemblies and external electrodes, said capacitor assemblies each consisting essentially of a thermoplastic resin film having consecutively thereon a metal film serving as a first internal electrode, an inorganic dielectric material film, and a metal film serving as a second internal electrode, said plurality of capacitor assemblies being stacked and laminated with each other to form a laminated body, said external electrodes each being provided on a respective end surface of said laminated body, at which said first or second internal electrode is exposed, and being electrically connected to said first and second internal electrodes, respectively.

2. A laminated capacitor as claimed in claim 1, wherein said thermoplastic resin film comprises poly (chlorotrifluoroethylene).

3. A process for producing a laminated capacitor, said process comprising the steps of:

(a) forming a first metal film functioning as a first internal electrode on a thermoplastic resin film;

(b) forming an inorganic dielectric material film on said first metal film; and (c) forming a second metal film functioning as a second internal electrode on said dielectric film to thereby form a capacitor assembly, said capacitor assembly consisting essentially of said thermoplastic resin film, said first metal film, said inorganic dielectric material film, and said second metal film; and then (d) stacking a plurality of said capacitor assemblies;

(e) laminating said plurality of stacked capacitor assemblies to thereby form a laminated body; and (f) forming external electrodes, each being on a respective end surface of said laminated body, and each being connected to a respective one of said first or second internal electrodes, which is exposed at said respective end surface of said laminated body.

4. A process as claimed in claim 3, wherein said thermoplastic resin film comprises poly(chlorotrifluoroethylene).

5. A process as claimed in claim 3, wherein step (e) is performed after step (d).

6. A process as claimed in claim 5, wherein steps (a)–(c) are performed consecutively in that order.

7. A process as claimed in claim 3, wherein steps (a)–(c) are performed consecutively in that order.

* * * * *